United States Patent
Nakajima (10) Patent No.: US 11,597,239 B2
(45) Date of Patent: Mar. 7, 2023

(54) TYRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 453 days.

(21) Appl. No.: 16/738,092

(22) Filed: Jan. 9, 2020

(65) Prior Publication Data
US 2020/0247192 A1 Aug. 6, 2020

(30) Foreign Application Priority Data
Feb. 5, 2019 (JP) .............................. JP2019-019051

(51) Int. Cl.
*B60C 13/00* (2006.01)

(52) U.S. Cl.
CPC .................................. *B60C 13/001* (2013.01)

(58) Field of Classification Search
CPC ....... B60C 13/001; B60C 13/00; B60C 13/02; B60C 11/01
See application file for complete search history.

(56) References Cited

U.S. PATENT DOCUMENTS

| | | | | |
|---|---|---|---|---|
| 2009/0218019 A1* | 9/2009 | Paturle | .................. | B29C 33/424 428/88 |
| 2012/0199261 A1* | 8/2012 | Yamakawa | ............ | B60C 13/001 152/523 |
| 2012/0227879 A1 | 9/2012 | Muhlhoff et al. | | |
| 2020/0062043 A1* | 2/2020 | Ishigaki | ................. | B60C 13/001 |
| 2020/0262251 A1* | 8/2020 | Sakaguchi | ............ | B60C 13/001 |
| 2020/0262252 A1* | 8/2020 | Sakaguchi | ............ | B60C 13/001 |

FOREIGN PATENT DOCUMENTS

| | | | | |
|---|---|---|---|---|
| DE | 102014203426 A1 * | 8/2015 | ........... | B60C 13/002 |
| FR | 2950566 A1 | 4/2011 | | |
| JP | 2009143488 A * | 7/2009 | ........... | B60C 13/001 |
| JP | 2012-183869 A | 9/2012 | | |
| JP | 2013071669 A * | 4/2013 | | |
| JP | 2013-129233 A | 7/2013 | | |
| WO | 2018-059758 A1 | 4/2018 | | |

OTHER PUBLICATIONS

JP 2009-143488 Machine Translation; Tomita, Shintaro (Year: 2009).*
JP 2013-071669 Machine Translstion; Minami, Yuji (Year: 2013).*
DE 102014203426 Machine Translation; Kreiger, Ralf (Year: 2015).*
European Search Report, EPO, Application No. 20152690.2, dated Jun. 19, 2020.

* cited by examiner

*Primary Examiner* — Katelyn W Smith
*Assistant Examiner* — Nicholas J Weiler
(74) *Attorney, Agent, or Firm* — Greenblum & Bernstein, P.L.C.

(57) ABSTRACT

A tyre with a concave mark provided on a surface of a sidewall portion. A bottom surface of the concave mark is divided into a shadow area and a remaining main area. The shadow area is an area along a shadow wall portion that is in the shadow of a wall portion of the concave mark when light is shed to the concave mark from a direction. The shadow area has a plurality of minute protrusions.

19 Claims, 7 Drawing Sheets

TYRE

TECHNICAL FIELD

The present invention relates to a tyre with improved legibility of a concave mark provided on a surface of a sidewall portion.

BACKGROUND ART

On the surface of the sidewall portion of the tyre, marks that are characters, symbols, and the like for representing the manufacturer name, brand name, size of the tyre, and the like are formed. Conventionally, such a mark is formed in a convex shape so as to protrude from the surface of the sidewall portion in order to improve its legibility. However, the convex mark has a large air resistance, therefore, it has an adverse effect on fuel efficiency.

Therefore, in Patent Document 1 below, it has been proposed to form the mark in a concave shape lower than the surface of the sidewall portion.

PRIOR ART DOCUMENT

Patent Document

[Patent Document 1]
Japanese Patent Application Publication No. 2013-129233

SUMMARY OF THE INVENTION

Problems to be Solved by the Invention

However, in the case of a concave mark, it cannot be made deep enough due to the limitation of the rubber thickness in the sidewall portion, therefore, it has inferior legibility. In the Patent Document 1, the deterioration of legibility is suppressed by disposing a rubber of a different color on the inner surface of the concave mark. However, the use of a rubber of a different color makes the tyre formation process complicated, which leads to disadvantages in production efficiency and cost.

An object of the present invention is to provide a tyre capable of increasing the legibility of the concave mark provided on the surface of the sidewall portion without using a rubber of a different color.

Means for Solving the Problems

The present invention is a tyre including A tyre comprising a concave mark provided on a surface of a sidewall portion and recessed from the surface, wherein a bottom surface of the concave mark is divided into a shadow area, which is an area along a shadow wall portion that is in the shadow of a wall portion of the concave mark when light is shed to the concave mark from a direction, and a main area other than the shadow area, and the shadow area has a plurality of minute protrusions.

In the tyre according to the present invention, it is preferred that in the shadow area, an area width (WA) from the shadow wall portion is larger than a depth (H) of the concave mark.

In the tyre according to the present invention, it is preferred that the direction is a diagonal direction when the concave mark is viewed from its front with an outer side in a tyre radial direction as the upper side.

In the tyre according to the present invention, it is preferred that the direction is the diagonal direction from an obliquely upper side as it goes from the radially outer side to the radially inner side.

In the tyre according to the present invention, it is preferred that the minute protrusions are rib-shaped protrusions, in which widths thereof are decreased toward top ends thereof, arranged in parallel with each other.

In the tyre according to the present invention, it is preferred that the rib-shaped protrusions have maximum widths of 50 μm or more and 1000 μm or less, protruding heights of 50 μm or more and 1000 μm or less, and distances of 100 μm or more and 1000 μm or less between centers of the rib-shaped protrusions adjacent to each other.

In the tyre according to the present invention, it is preferred that the rib-shaped protrusions extend in the same direction as the direction.

In the tyre according to the present invention, it is preferred that the minute protrusions are columnar protrusions.

In the tyre according to the present invention, it is preferred that the columnar protrusions have maximum diameters of 50 μm or more and 1000 μm or less, protruding heights of 50 μm or more and 1000 μm or less, and distances of 100 μm or more and 1000 μm or less between centers of the columnar protrusions adjacent to each other.

In the tyre according to the present invention, it is preferred that the columnar protrusions have truncated conical shapes having smaller diameters on a side of upper ends thereof.

In the tyre according to the present invention, it is preferred that the columnar protrusions have concave portions at their top ends.

In the tyre according to the present invention, it is preferred that depths of the concave portions are 15% or more of protruding heights of the columnar protrusions.

Effects of the Invention

In the present invention, as described above, the bottom surface of the concave portion is divided into the shadow area and the remaining main area. The shadow area means the area along the shadow wall portion that is in the shadow of the wall portion of the concave mark when light is shed to the concave mark from the direction. And by providing a plurality of the minute protrusions, the absorption rate of the light is increased, therefore, it is possible that the shadow area (Ya) is made to look darker than the main area.

Thereby, contrast is given to the bottom surface of the concave mark, therefore, it is possible that the shadow area is made to look like the shadow made by the wall portion when light is shed from the direction. Further, it is possible that the shadow is made to look like a part of the wall portion of the concave mark. And by these optical illusions, it is possible that the concave mark is made to look deeper than its actual depth, therefore, the legibility can be increased.

MODE FOR CARRYING OUT THE INVENTION

An embodiment of the present invention will now be described in conjunction with accompanying drawings.

Figure 1:
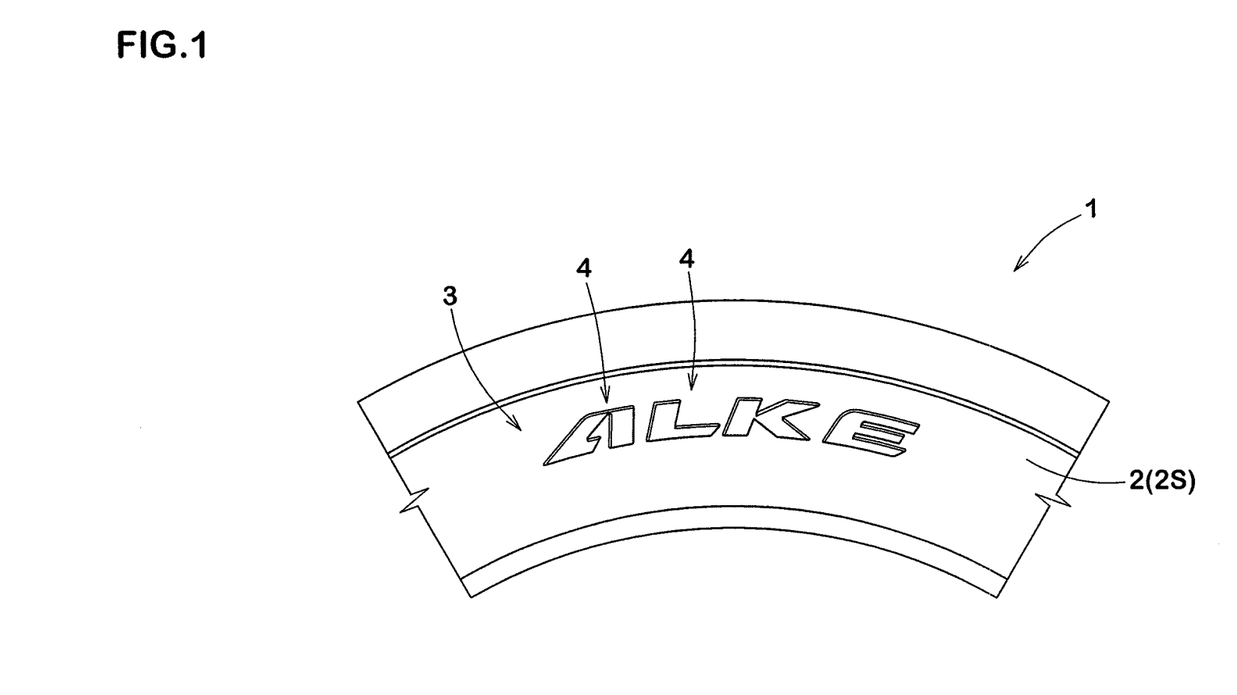
FIG. 1 A side view of one of sidewall portions of a tyre of an embodiment of the present invention.

As shown in FIG. 1, a tyre 1 of the present invention is provided with a mark 3 showing a tyre manufacturer name, brand name, size, and the like on at least one of sidewall portions 2.

The mark 3 is composed of at least one concave mark 4. The concave mark 4 is a character, a symbol, a figure or the like, and it means the smallest unit constituting the mark 3. In this embodiment, an example is shown in which the mark 3 (a brand name, for example) that is a character string of "ALICE" is formed by four concave marks 4 that are "A", "L", "K", and "E".

Figure 2A:
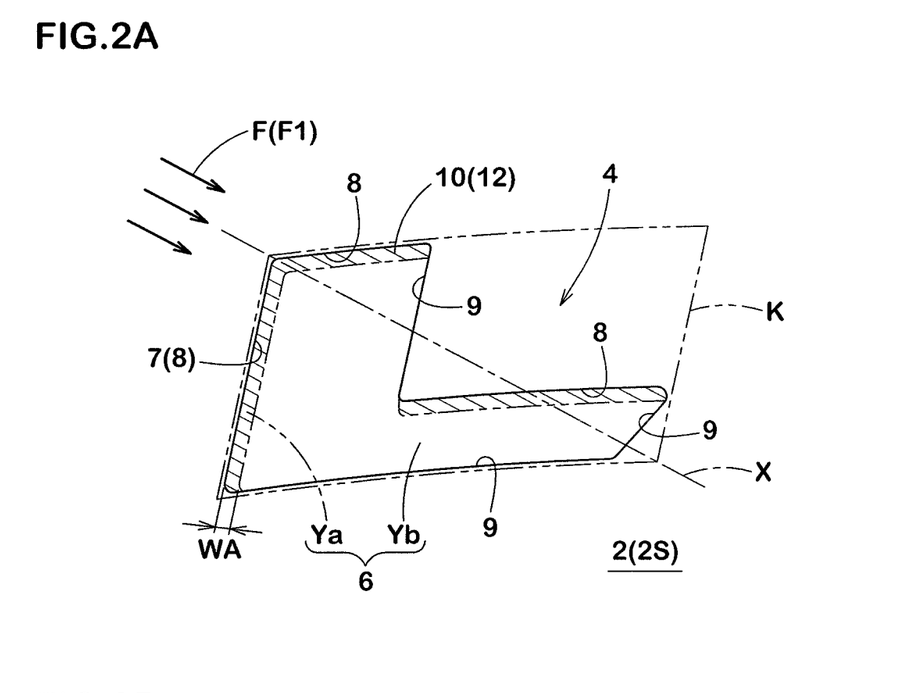
FIG. 2A A front view of a concave mark.
Figure 2B:
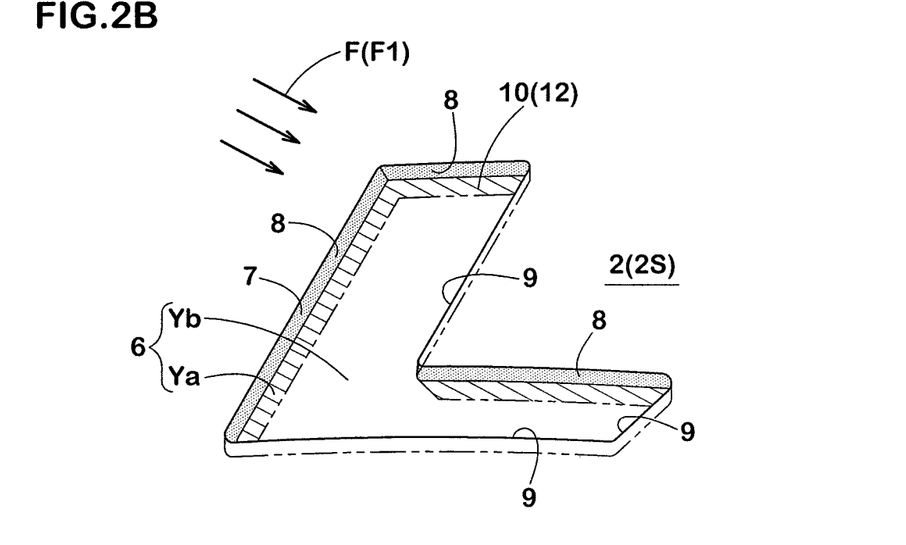
FIG. 2B A perspective view of the concave mark.

As shown in FIGS. 2A and 2B, the concave mark 4 is formed as a mark recessed in a step shape from a surface 2S of the sidewall portion 2. That is, the concave mark 4 includes a bottom surface 6 and a wall portion 7 that rises from the bottom surface 6 and forms the contour of the concave mark 4.

The bottom surface 6 is divided into a shadow area. (Ya) and a main area (Yb) other than the shadow area (Ya). Here, the shadow area (Ya) means a width area on the bottom surface 6 along a shadow wall portion 8. Further, the shadow wall portion 8 means a portion of the wall portion 7 that is in the shadow when light is shed to the concave mark 4 from an arbitrary direction (F). In this embodiment, an example is shown in which light is shed from the upper left direction in a front view. As a result, the light is blocked in portions of the wall portion 7 located on the left side and the upper side of the bottom surface 6 (shown in gray for convenience), therefore, these portions are in the shadow. That is, the portion of the wall portion 7 where the light is blocked and thus in the shadow is the shadow wall portion 8. Further, the other portion of the wall portion 7 is a bright wall portion 9 that is exposed to light.

And a plurality of minute protrusions 10 are formed in the shadow area (Ya) positioned along the shadow wall portion 8. In FIGS. 2A and 2B, an example is shown in which the minute protrusions 10 are rib-shaped protrusions 12 described later, and, for the sake of convenience, only the ridgelines of the rib-shaped protrusions 12 are shown in the figures. It should be noted that the main area (Yb) is formed of a flat and smooth surface that is substantially free of unevenness.

It is possible that the minute protrusions 10 increase an absorption rate of the light, therefore, it is possible that the shadow area (Ya) is made to look darker than the main area (Yb).

As a result, contrast (light and dark) is given to the bottom surface 6 of the concave mark 4, therefore, it is possible that the shadow area (Ya) is made to look like the shadow made by the wall portion 7 when light is shed from the direction (F). Further, it is possible that this shadow is made to look like a part of the wall portion 7 of the concave mark 4. And by these optical illusions, it is possible that the concave mark 4 is made to look deeper than its actual depth, therefore, the three-dimensional effect is increased, thereby, the legibility can be increased.

Here, as shown in FIG. 2A, it is preferred that the direction (F) is a diagonal direction (F1) when the concave mark 4 is viewed from its front with an outer side in a tyre radial direction as the upper side. In particular, it is preferred that the direction (F) is the diagonal direction (F1) from the obliquely upper side going from the radially outer side to the radially inner side. As a result, it is possible that the three-dimensional effect given to the concave mark 4 is further increased. The front view means a view in which the concave mark 4 is viewed from its front with the radially outer side as the upper side. Further, the diagonal direction (F1) means a direction having an angle of 20 degrees or less, preferably 10 degrees or less with respect to a reference line (X), when a diagonal line of a parallelogram (K) having the smallest area among the parallelograms surrounding the concave mark 4 is taken as the reference line (X).

Figure 7A:
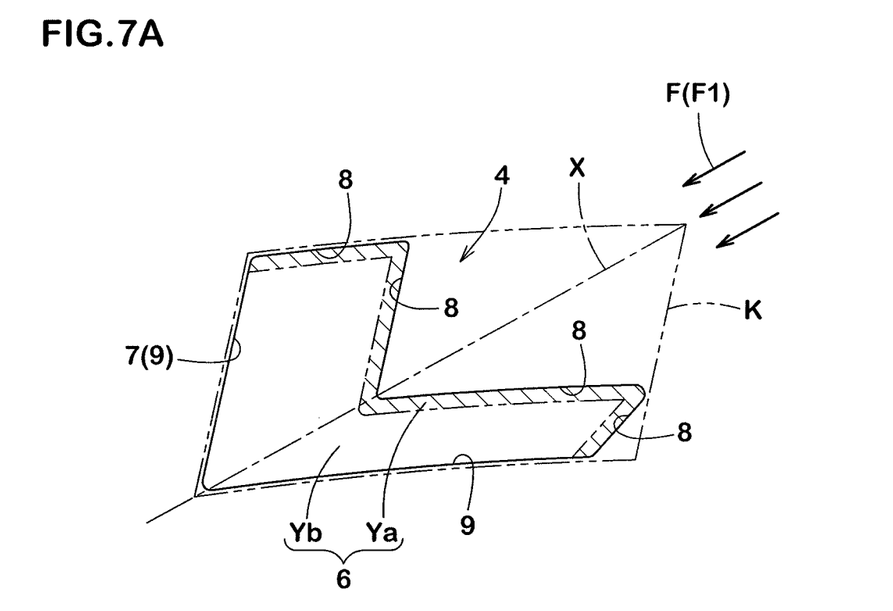
FIG. 7A A front view of the concave mark when the direction is a diagonal direction from an obliquely upper left side.
Figure 7B:
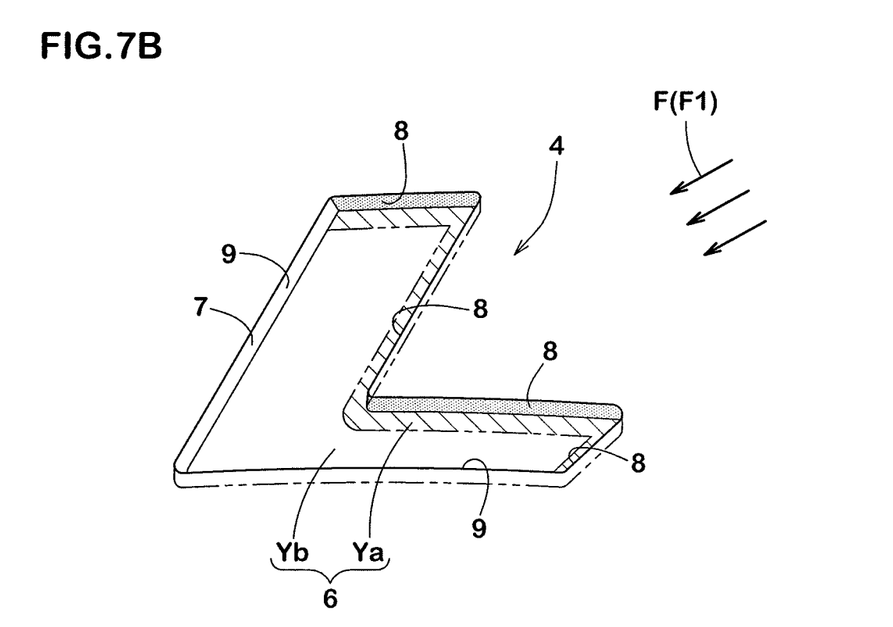
FIG. 7B A perspective view of the concave mark when the direction is the diagonal direction from the obliquely upper left side.

In FIGS. 2A and 2B, an example is shown in which the direction (F) is the diagonal direction (F1) from the upper left side among the diagonal directions (F1) from the diagonally upper side. However, as shown in FIGS. 7A and 7B, the direction (F) may be the diagonal direction (F1) from the upper right side.

Figure 3:
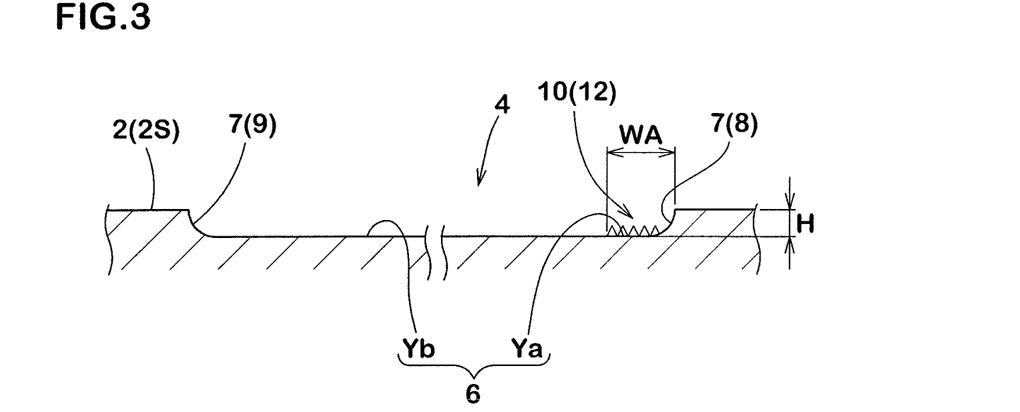
FIG. 3 A cross-sectional view of the concave mark.
Figure 4:
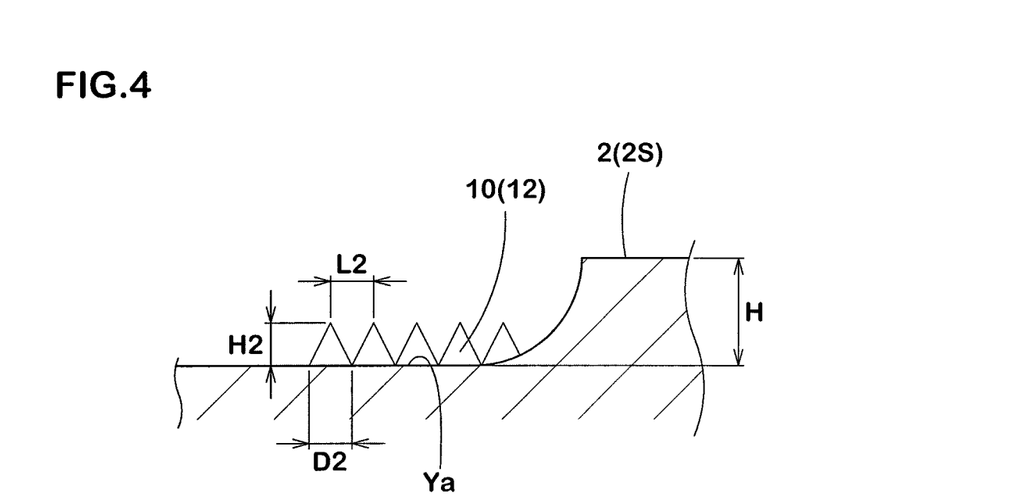
FIG. 4 An enlarged cross-sectional view showing a shadow area along with minute protrusions.

As conceptually shown in FIGS. 3 and 4, it is preferred that an area width (WA) of the shadow area (Ya) from the shadow wall portion 8 is larger than a depth (H) of the concave mark 4. Thereby, it is possible that the concave mark 4 is made to look deeper. The area width (WA) is a width in a direction perpendicular to a length direction of the shadow wall portion 8. Although the upper limit of the area width (WA) is not particularly limited, it is preferred that it is 4.0 times or less the depth (H) for the purpose of giving a three-dimensional effect. Further, although the depth (H) is not particularly limited, it is generally 0.3 mm or more and 1.0 mm or less due to the restriction of the rubber thickness of the sidewall portions 2.

As the minute protrusions 10, the rib-shaped protrusions 12 extending in parallel with each other can be suitably employed. It is preferred that these rib-shaped protrusions 12 each have a triangular or trapezoidal cross section, taken perpendicular to a length direction thereof, in which a width is decreased toward an upper end thereof. In particular, it is preferred that the rib-shaped protrusions 12 extend in the same direction as the direction (F) (shown in FIG. 2A). Thereby, the effect of the shadow area (Ya) looking like the wall portion 7 is increased, therefore, the three-dimensional effect can be increased.

It is preferred that at least one, each in this embodiment, of the rib-shaped protrusions 12 has a maximum width (D2) of 50 μm or more and 1000 μm or less, a protruding height (H2) of 50 μm or more and 1000 μm or less, and a distance (L2) of 100 μm or more and 1000 μm or less between centers of the rib-shaped protrusions 12, 12 adjacent to each other. Since the rib-shaped protrusions 12 having such a size are less likely to reflect light, the absorption rate of light is increased, therefore, it is possible that the shadow area (Ya) is made to look darker.

Figure 5:
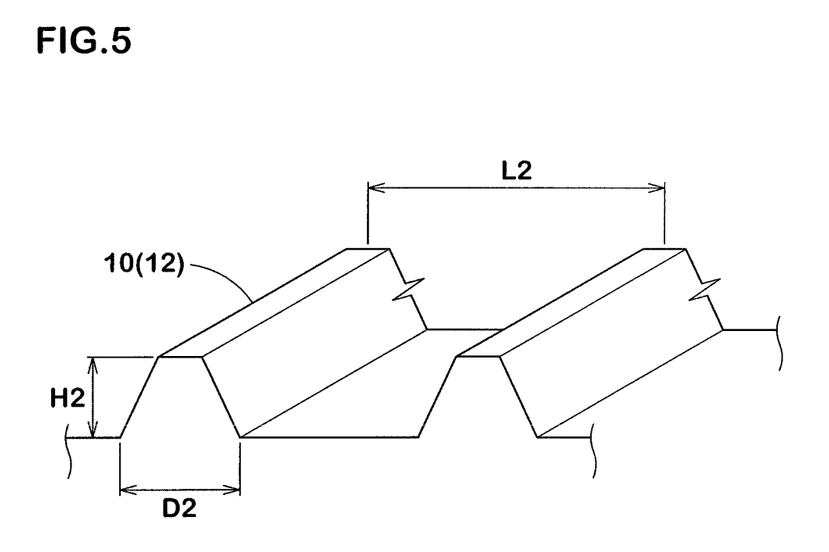
FIG. 5 A partial perspective view showing an example of rib-shaped protrusions.

It should be noted that, as shown in FIG. 5, the rib-shaped protrusions 12 may have a trapezoidal cross-sectional shape formed in such a manner that a top portion of a triangle is removed.

Figure 6A:
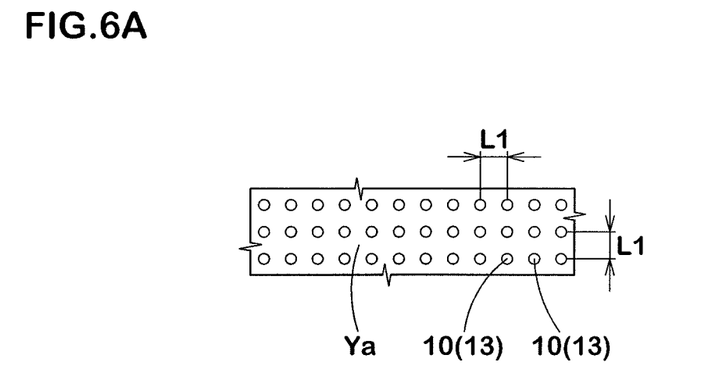
FIG. 6A A partial plan view showing an arrangement of columnar protrusions.
Figure 6B:
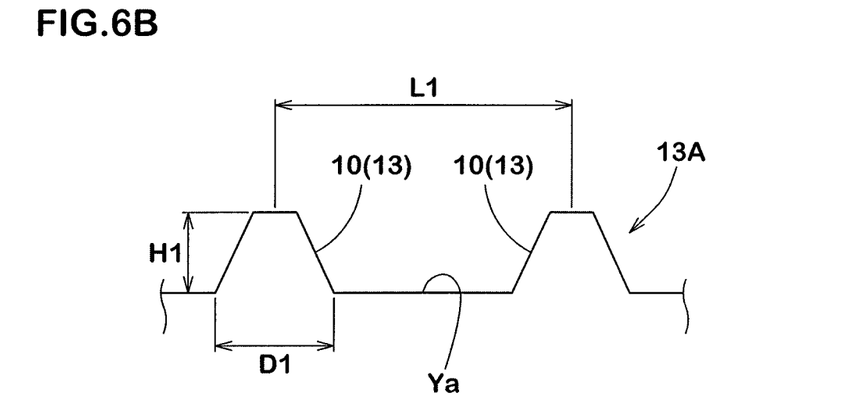
FIG. 6B A cross-sectional view showing the arrangement of the columnar protrusions.

In FIGS. 6A and 6B, the minute protrusions 10 according to another embodiment are shown. In this embodiment, the minute protrusions 10 are formed as columnar protrusions 13. Also in the case of these columnar protrusions 13, the absorption area of light is increased, therefore, it is possible that the shadow area (Ya) is made to look darker than the main area (Yb).

As a result, contrast (light and dark) is given to the bottom surface 6 of the concave mark 4, therefore, it is possible that the shadow area (Ya) is made to look like the shadow made by the wall portion 7 when light is shed from the direction (F). Further, it is possible that this shadow is made to look like a part of the wall portion 7 of the concave mark 4. And by these optical illusions, it is possible that the concave mark 4 is made to look deeper than its actual depth, therefore, the three-dimensional effect is increased, thereby, the legibility can be increased.

It is preferred that at least one, each in this embodiment, of the columnar protrusions 13 has a maximum diameter (D1) of 50 μm or more and 1000 μm or less, a protruding height (H1) of 50 μm or more and 1000 μm or less, and a distance (L1) of 100 μm or more and 1000 μm or less between centers of the columnar protrusions 13, 13 adjacent to each other. Since the columnar protrusions 13 having such a size are less likely to reflect light, the absorption rate of light is increased, therefore, it is possible that the shadow area (Ya) is made to look darker.

In FIG. 6A, a case in which the columnar protrusions 13 are arranged in a grid pattern is shown. However, they may be arranged in a staggered pattern, or may be randomly arranged as long as the distance (L1) satisfies the above range.

In this embodiment, as the columnar protrusions 13, columnar protrusions 13A having a truncated conical shape having a smaller diameter on an upper end side thereof is shown. However, the columnar protrusions 13 may be columnar protrusions 13B having a cylindrical shape having a constant diameter (shown in FIG. 8B) or a prismatic columnar shape.

Figure 8A:
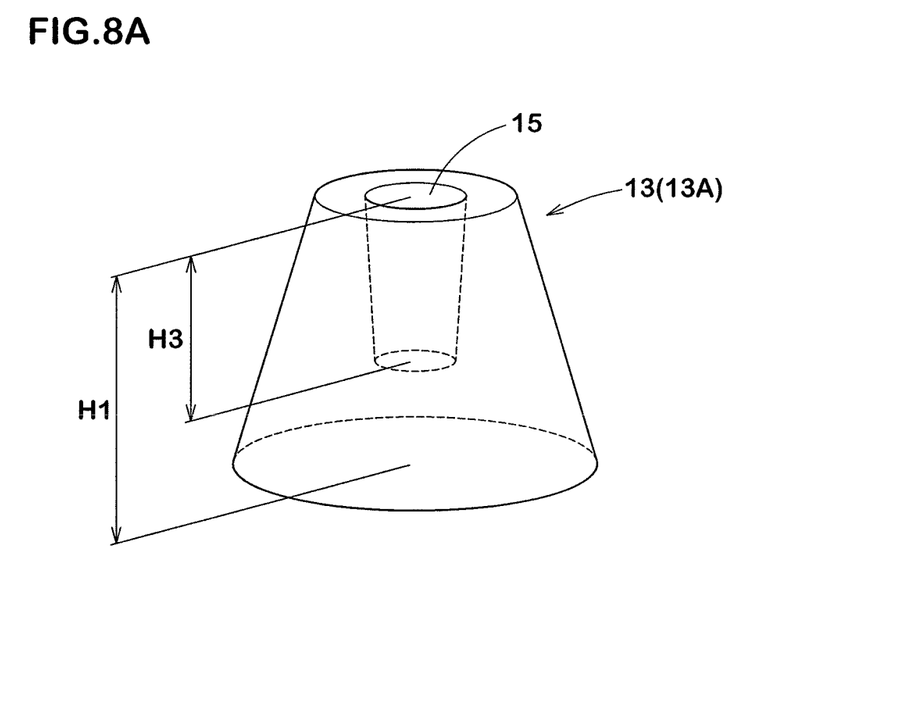
FIG. 8A A perspective view showing the columnar protrusion according to another embodiment.
Figure 8B:
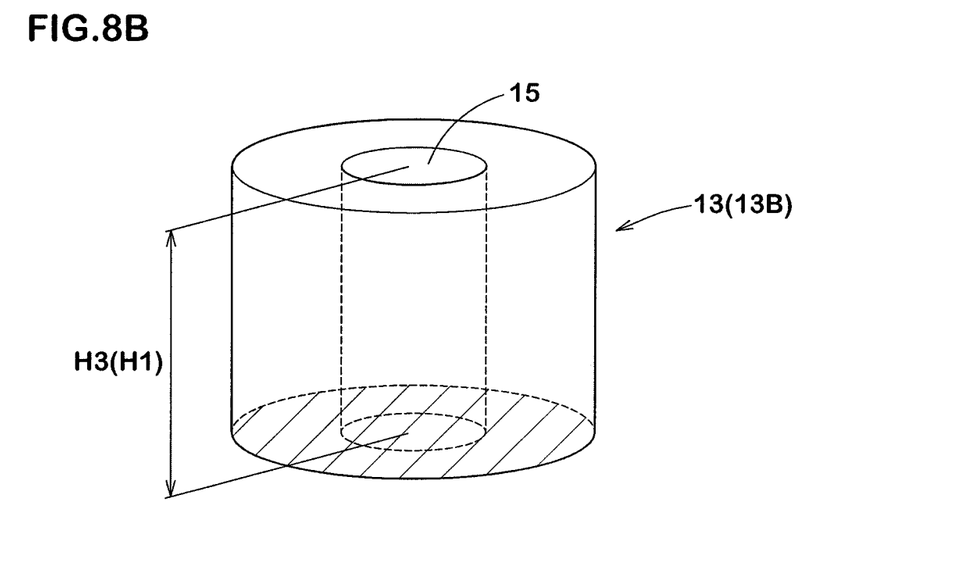
FIG. 8B A perspective view showing the columnar protrusion according to yet another embodiment.

In FIGS. 8A and 8B, the columnar protrusions 13 according to further other embodiments are shown. At least one, each in these embodiments, of the columnar protrusions 13 in these embodiments has a concave portion 15 at a top end thereof. Since these concave portions 15 decrease reflection of the irradiated light, it is possible that the shadow area (Ya) is made to look even darker, therefore, the three-dimensional effect of the concave mark 4 can be further increased.

It is preferred that at least one, each in this embodiment, of the concave portions 15 is formed concentrically with a corresponding one of the columnar protrusions 13. Further, in at least one, each in this embodiment, of the columnar protrusions 13, it is preferred that a cross-sectional shape of the concave portion 15 taken orthogonal to a height direction of the columnar protrusion 13 is similar to the cross-sectional shape of the columnar protrusion 13 in order to maintain the strength uniformly.

In these embodiments, the cross-sectional shapes of the concave portions 15 and the columnar protrusions 13 are circular. Further, as shown in FIG. 8A, at least one, each in this embodiment, of the concave portions 15 in this embodiment have a so-called tapered shape in which the inner diameter gradually and smoothly decreases as the depth of the concave portions 15 increases. However, as shown in FIG. 8B, the concave portions 15 may have a straight hole shape with a constant inner diameter.

It is preferred that at least one, each in this embodiment, of depths (H3) of the concave portions 15 is 15% or more of each of the protruding heights (H1) of the columnar protrusions 13 in order to decrease the light reflection. Further, the upper limit of at least one, each in this embodiment, of the depths (H3) is preferably 100% or less, more preferably 90% or less of the protruding height (H1) from the point of view of securing the rigidity of the columnar protrusion 13.

While detailed description has been made of the tyre as especially preferred embodiments of the present invention, the present invention can be embodied in various forms without being limited to the illustrated embodiments.

Working Examples (Examples)

As shown in FIG. 1, tyres provided with the mark (a character string of "ALKE") formed by the concave marks 4 on the surfaces of the sidewall portions were made by way of test according to the specifications listed in Table 1, and then the legibility of the marks was compared.

As shown in FIGS. 2A and 2B, the shadow area is the area along the shadow wall portion that is in the shadow of the wall portion of the concave mark when light is shed to the concave mark from the direction (the diagonal direction (F1) from the upper left side).

When the minute protrusions were the rib-shaped protrusions (having triangular cross sections), the maximum width (D2) was 100 μm, the protruding height (H2) was 200 μm, and the distance (L2) was 200 μm. Further, when the minute protrusions were the columnar protrusions having truncated conical shapes, the maximum diameter (D) was 100 μm, the protruding height (H1) was 200 μm, and the distance (L1) was 200 μm. Furthermore, in Example 5, the depth of the concave portion provided at the top end of the columnar protrusion is 15% of the protruding height of the columnar protrusion.

The legibility was evaluated by a visual inspection and indicated by an index based on Reference 1 being 100. A larger numerical value is better.

TABLE 1

|  | Ref. 1 | Ex.1 | Ex.2 | Ex.3 | Ex.4 | Ex.5 |
|---|---|---|---|---|---|---|
| < Concave mark > |  |  |  | Present |  |  |
| Depth (H) [mm] |  |  |  | 0.5 |  |  |
| Shadow area | Absent |  |  | Present |  |  |
| Area width WA of Shadow area/Depth (H) | — | 2.5 | 1.0 | 2.5 | 2.5 | 2.5 |
| Minute protrusion |  |  |  | Present |  |  |
| Rib-shaped protrusion | — | Present | Present | — |  |  |
| Direction of Ridgeline *1 | — | Same | Orthogonal | — |  |  |
| Columnar protrusion having Truncated conical shape | — | — | — | — | Present |  |

TABLE 1-continued

|  | Ref. 1 | Ex.1 | Ex.2 | Ex.3 | Ex.4 | Ex.5 |
|---|---|---|---|---|---|---|
| (Presence or Absence of Concave portion) | — | — | — | — | (Absence) | (Presence) |
| Legibility | 100 | 130 | 115 | 120 | 120 | 130 |

*1 "Same" means that the ridgeline of the rib-shaped protrusion extends in the same direction as the direction (F), and "orthogonal" means that the ridgeline of the rib-shaped protrusion extends orthogonally to the direction (F).

As shown in Table 1, it can be confirmed that the Examples showed excellent legibility of the mark.

DESCRIPTION OF REFERENCE SIGNS 1 tyre
2 sidewall portion
2S surface
4 concave mark
6 bottom surface
7 wall portion
8 shadow wall portion
10 minute protrusion
12 rib-shaped protrusion
13 columnar protrusion
15 concave portion
F1 diagonal direction
F direction
Ya shadow area
Yb main area

The invention claimed is:

1. A tire comprising:
a concave mark provided on a surface of a sidewall portion and recessed from the surface, wherein
a bottom surface of the concave mark is divided into a shadow area, which is an area along a shadow wall portion that is in a shadow of a wall portion of the concave mark when light is shed to the concave mark from a direction, and a main area other than the shadow area,
the shadow area has a plurality of minute protrusions,
the minute protrusions are columnar protrusions,
the columnar protrusions have concave portions at their top ends, and
at least one of the concave portions is formed concentrically with a corresponding one of the columnar protrusions.

2. The tire according to claim 1, wherein
in the shadow area, an area width (WA) from the shadow wall portion is larger than a depth (H) of the concave mark.

3. The tire according to claim 1, wherein
the direction is a diagonal direction when the concave mark is viewed from its front with an outer side in a tire radial direction as the upper side.

4. The tire according to claim 3, wherein
the direction is the diagonal direction from an obliquely upper side as it goes from the radially outer side to the radially inner side.

5. The tire according to claim 1, wherein
the columnar protrusions have maximum diameters of 50 μm or more and 1000 μm or less, protruding heights of 50 μm or more and 1000 μm or less, and distances of 100 μm or more and 1000 μm or less between centers of the columnar protrusions adjacent to each other.

6. The tire according to claim 1, wherein
the columnar protrusions have truncated conical shapes having smaller diameters on a side of upper ends thereof.

7. The tire according to claim 1, wherein
depths of the concave portions are 15% or more of protruding heights of the columnar protrusions.

8. The tire according to claim 7, wherein
the depths of the concave portions are 100% or less of the protruding heights of the columnar protrusions.

9. The tire according to claim 1, wherein
the main area has a smooth surface.

10. The tire according to claim 1, wherein
the columnar protrusions are arranged in a grid pattern, in a staggered pattern, or randomly.

11. The tire according to claim 1, wherein
the columnar protrusions have cylindrical shapes having constant diameters or prismatic columnar shapes.

12. The tire according to claim 1, wherein
in at least one of the columnar protrusions, a cross-sectional shape of the concave portion taken orthogonal to a height direction of the columnar protrusion is a same shape as a cross-sectional shape of the columnar protrusion.

13. The tire according to claim 1, wherein
at least one of the concave portions has a tapered shape in which an inner diameter thereof gradually decreases as a depth thereof increases, or a straight hole shape with the constant inner diameter.

14. A tire comprising:
a concave mark provided on a surface of a sidewall portion and recessed from the surface, wherein
a bottom surface of the concave mark is divided into a shadow area, which is an area along a shadow wall portion that is in a shadow of a wall portion of the concave mark when light is shed to the concave mark from a direction, and a main area other than the shadow area,
the shadow area has a plurality of minute protrusions,
the main area has no minute protrusions, and
the concave mark is an entire area surrounded by a contour of a single continuous surface concave from the surface of the sidewall portion.

15. The tire according to claim 14, wherein
the minute protrusions are rib-shaped protrusions, in which widths thereof are decreased toward top ends thereof, arranged in parallel with each other.

16. The tire according to claim 15, wherein
the rib-shaped protrusions have maximum widths of 50 μm or more and 1000 μm or less, protruding heights of 50 μm or more and 1000 μm or less, and distances of 100 μm or more and 1000 μm or less between centers of the rib-shaped protrusions adjacent to each other.

17. The tire according claim 15, wherein
the rib-shaped protrusions extend in the same direction as the direction.

18. The tire according to claim 15, wherein
the rib-shaped protrusions have triangular or trapezoidal cross sections taken orthogonal to length directions thereof.

19. A tire comprising:
a concave mark provided on a surface of a sidewall portion and recessed from the surface, wherein
a bottom surface of the concave mark is divided into a shadow area, which is an area along a shadow wall portion that is in a shadow of a wall portion of the concave mark when light is shed to the concave mark from a direction, and a main area other than the shadow area,
an area width (WA) of the shadow area from the shadow wall portion is larger than a depth (H) of the concave mark, and the area width (WA) is 4.0 times or less than the depth (H), and
the shadow area has a plurality of minute protrusions, and an entirety of the bottom surface outside of the shadow area is disposed as a smooth surface without any protrusion.

\* \* \* \* \*